United States Patent
Patel et al.

(10) Patent No.: US 9,665,581 B1
(45) Date of Patent: May 30, 2017

(54) MANAGING FILE SYSTEM CHECKING

(75) Inventors: Dixit Patel, Monrow, NJ (US);
Srinivasa Vempati, Upton, MA (US);
Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 817 days.

(21) Appl. No.: 12/980,911

(22) Filed: Dec. 29, 2010

(51) Int. Cl.
*G06F 17/30* (2006.01)

(52) U.S. Cl.
CPC .............................. *G06F 17/30091* (2013.01)

(58) Field of Classification Search
CPC ................................................ G06F 17/30091
USPC ....................... 707/822, 828, 999.2; 711/114
See application file for complete search history.

(56) References Cited

U.S. PATENT DOCUMENTS

| | | | |
|---|---|---|---|
| 7,685,360 B1* | 3/2010 | Brunnett et al. | 711/112 |
| 2002/0049883 A1* | 4/2002 | Schneider et al. | 711/100 |
| 2003/0182389 A1* | 9/2003 | Edwards | 709/213 |

* cited by examiner

*Primary Examiner* — Syling Yen
(74) *Attorney, Agent, or Firm* — Krishnendu Gupta; Jason A. Reyes; Deepika Bhayana (57) ABSTRACT

A method is used in managing file system checking. A logical space is created from a set of cylinder groups. The logical space includes respective unused blocks in each cylinder group of the set of cylinder groups. Each cylinder group of the set of cylinder groups is configured to store metadata and data of a file system. Information required to perform file system checking on the file system is stored in the logical space. File system checking is performed on the file system.

18 Claims, 12 Drawing Sheets

MANAGING FILE SYSTEM CHECKING

BACKGROUND

Technical Field

This application relates to managing file system checking.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there always exists the potential for data corruption in any computer system and therefore measures are taken to periodically ensure that the file system is consistent and accurate. In a data storage system, hundreds of files might be created, modified, and deleted on a regular basis. Each time a file is modified, the data storage system performs a series of file system updates. These updates, when written to a disk storage reliably, yield a consistent file system. However, a file system can develop inconsistencies in several ways. Problems might result from an unclean shutdown, if a system is shut down improperly, or when a mounted file system is taken offline improperly. Inconsistencies can also result from defective hardware or hardware failures. Additionally, inconsistencies can also result from software errors or user errors.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The amount of time required to execute the FSCK utility on a file system is generally linearly proportional to the size of the file system. Thus the FSCK utility may take a large amount of time to verify a large file system. For example, the FSCK utility may take hours or days to verify a file system of few terabyte in size. As the size of file systems continues to grow, the time and storage resources required to check file systems becomes an obstacle, greatly hindering uptime of file systems and adversely affecting the performance of the data storage system.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

SUMMARY OF THE INVENTION

A method is used in managing file system checking. A logical space is created from a set of cylinder groups. The logical space includes respective unused blocks in each cylinder group of the set of cylinder groups. Each cylinder group of the set of cylinder groups is configured to store metadata and data of a file system. Information required to perform file system checking on the file system is stored in the logical space. File system checking is performed on the file system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing file system checking In accordance with the technique, a method may be provided for creating an object, particularly a swap space volume, in a data storage system from a set of unused file system blocks of a file system, such that a File System Checking (FSCK) utility may use the object to store information required by the FSCK utility for verifying consistency of the file system.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata. In such systems, the FSCK utility requires a large amount of memory to store information such as bitmaps, in order to process the metadata of the file system for verifying the integrity of the file system. For example, one of the bitmaps maintained by the FSCK utility is a block bitmap that includes one bit for every file system block in the file system. Thus, in such a case, for example, if the file system is 256 terabytes (TB) in size and the file system block is 4 kilobytes (KB) in size, the FSCK utility requires at least 64 gigabytes (GB) of memory just to store one block bitmap. As a result, verification of the integrity of a large file system consumes more storage resources and memory of the data storage system. Therefore, given a limited amount of memory and/or storage resources, not all information required for such verification can fit into such memory of the storage system. A goal is to provide additional storage space to a FSCK utility efficiently and to create that storage space using the least or a reduced amount of time, memory and storage resources.

Conventionally, a file system checking (FSCK) utility for feature software requires that information needed for verification by the FSCK utility be stored on disks and accessed from disks as and when needed for checking the consistency of a file system. As a result, in a conventional system, the FSCK utility stores information, such as bitmaps, on an external storage device (e.g., disk volumes). Thus, conventionally in such a case, a swap space volume is created from the external storage device for storing information required by the FSCK utility to verify integrity of a file system. Further, information is stored for the entire duration of time it takes to verify a file system. Therefore, in such conventional system, the total amount of memory and swap space available to the FSCK utility may limit the maximum size of a file system that can be verified for consistency, and may also limit the number of file systems that can be verified simultaneously. Additionally, in such conventional system, components of the feature software incur extra overhead in managing a swap space volume created from an external storage space in order to verify integrity of a file system. Thus, in such conventional system, the data storage system cannot start execution of file system checking (FSCK) utility unless an external storage space is available and is configured to be used by the FSCK utility. Additionally, in such a conventional system, the external storage may be allocated from any type of disk storage that may be different from the type of storage on which file systems are stored. Thus, in such a conventional system, performance of I/O operations directed to the external storage space is not deterministic.

By contrast, in at least some implementations in accordance with the technique as described herein, creating a swap space volume from a set of unused blocks of a file system provides best or improved use of otherwise wasted space in the file system and helps reduce the amount of overhead involved in managing the swap space volume. In at least one storage system implementation as described below, finding storage space within the file system to store information required by the FSCK utility improves the data storage system's performance dramatically.

In at least some implementations in accordance with the technique as described herein, use of managing file system checking can provide one or more of the following advantages: lowering costs by efficiently providing a storage space to the FSCK utility, improving memory utilization by creating a storage space within a file system for verification of the file system, reducing the amount of storage required for file system checking by creating a swap space from a set of unused file system blocks of a file system and improving performance of the data storage system by preserving information regarding metadata of a file system within the file system itself, thus providing an ability to pause the FSCK utility and later resume the FSCK utility with minimal amount of overhead.

Figure 1:
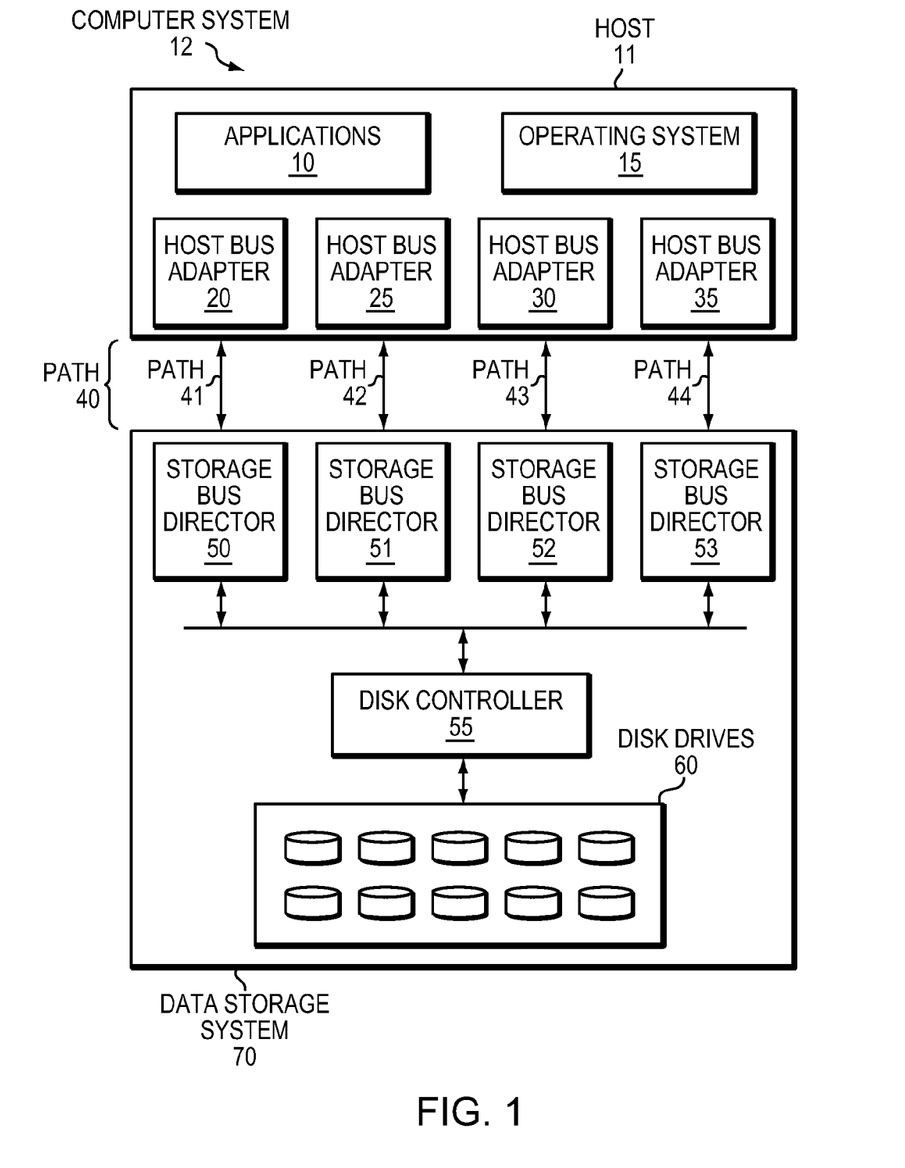
FIG. 1 is an example of an embodiment of a computer system that may utilize the techniques described herein.

Referring to FIG. 1, shown is an example of an embodiment of a computer system that may be used in connection with performing the techniques described herein. A computer system may include multiple hosts and multiple data storage systems in such a way that each host may access data on each of data storage systems. For simplicity, however, FIG. 1 illustrates a computer system 12 that includes a single host 11 and a single data storage system 70. Applications 10 running on operating system 15 of host 11 may access data in data storage system 70 via I/O driver and host bus adapters 20, 25, 30, and 35. Host 11 can be, for example, a server, a personal computer, or any other device capable of initiating read and write requests to data storage system 70. Data storage system 70 can be a single physical data storage device or a data storage system comprising multiple physical data storage devices including an enterprise storage system. In computer system, consistent with the principles of the invention, there may be a plurality of data storage systems 70 accessible by host 11 and each data storage system may be unique.

Host 11 has multiple paths 40 for sending I/O requests to data storage system 70. Typically, there are at least two paths from a host to a data storage system. FIG. 1 shows four paths from host 11 to data storage system 70: path 41, path 42, path 43, and path 44. Each of the paths 40 can be any of a number of different types of communication links that allow data to be passed between data storage system 70 and host 11. Each of the host bus adapters 20, 25, 30, and 35 would be adapted to communicate using an appropriate protocol via the paths 40 with the storage bus directors 50, 51, 52 and 53. For example, path 40 can be implemented as a SCSI bus with host bus adapters 20 and storage bus director 50 each being a SCSI driver. Alternatively, path 40 between the host 11 and the data storage subsystem 70 may be a Fibre Channel fabric. Moreover, a path 40 may include multiple communication path types and may be part of a communication network.

In this embodiment of the computer system 12, the host 11 may access the data storage systems 70, for example, in performing input/output (I/O) operations, data requests, and other operations. The host 11 may perform different types of data operations in accordance with different types of tasks. The communication medium, path 40, may be any one or more of a variety of networks or other type of communication connections as known to those skilled in the art. Each of the paths 41-44 may be a network connection, bus, and/or other type of data link, such as a hardwire or other connections known in the art. The processors included in the host computer systems 11 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 70 are described herein in more detail, and may vary with each particular embodiment. The host 11 and data storage system 70 may all be located at the same physical site, or, alternatively, may also be located in different physical locations.

Storage bus directors 50, 51, 52 and 53 further communicates with the disk controller 55 to access data stored on the disk drives 60. the disk controller 55 may be configured to perform data storage operations on behalf of the host 11. Host system 11 may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single data storage system may be accessed by multiple hosts allowing the hosts to share the data residing therein. An LV or LUN (logical unit number) may be used to refer to the foregoing logically defined devices or volumes.

Figure 2:
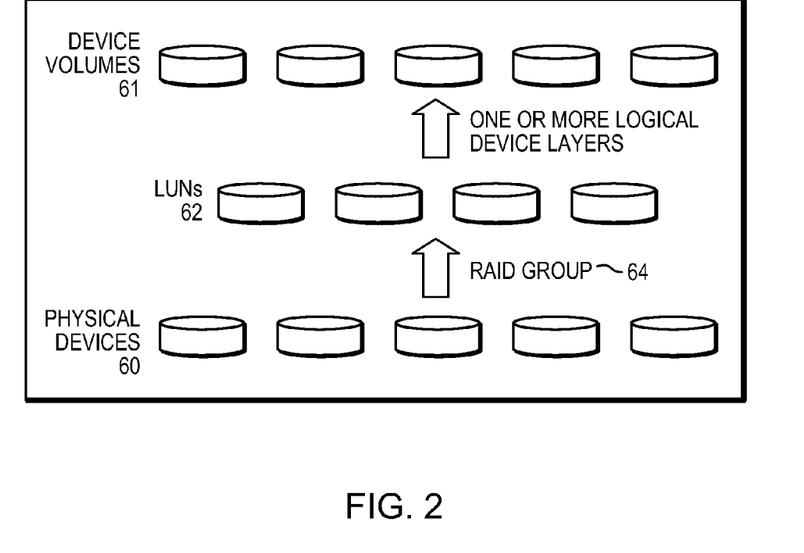
FIG. 2 is an example illustrating storage device layout.

FIG. 2 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

In another embodiment, the data storage subsystem 70 may include one or more data storage systems such as one or more of the data storage systems offered by EMC Corporation of Hopkinton, Mass. The data storage system may also include one or more data storage devices, such as disks. One or more data storage subsystems may be manufactured by one or more different vendors. Each of the data storage systems may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 70. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 70 of FIG. 1 is implemented using one or more data storage systems, each of the data storage systems may include code thereon for performing the techniques as described herein. In following paragraphs, reference may be made to a particular embodiment such as, for example, an embodiment in which element 70 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

As will be appreciated by those skilled in the art, the data storage system 70 may also include other components than as described for purposes of illustrating the techniques herein.

The embodiment of FIG. 1 benefits from using a storage space created within a file system in accordance with the current technique in order to improve the performance of a file system checking (FSCK) utility within the embodiment. In an alternative embodiment, the current technique enables data storage system 70 to pause file system checking (FSCK) of a file system and later resumes FSCK of the file system from the point FSCK was paused while verifying the file system.

Figure 3:
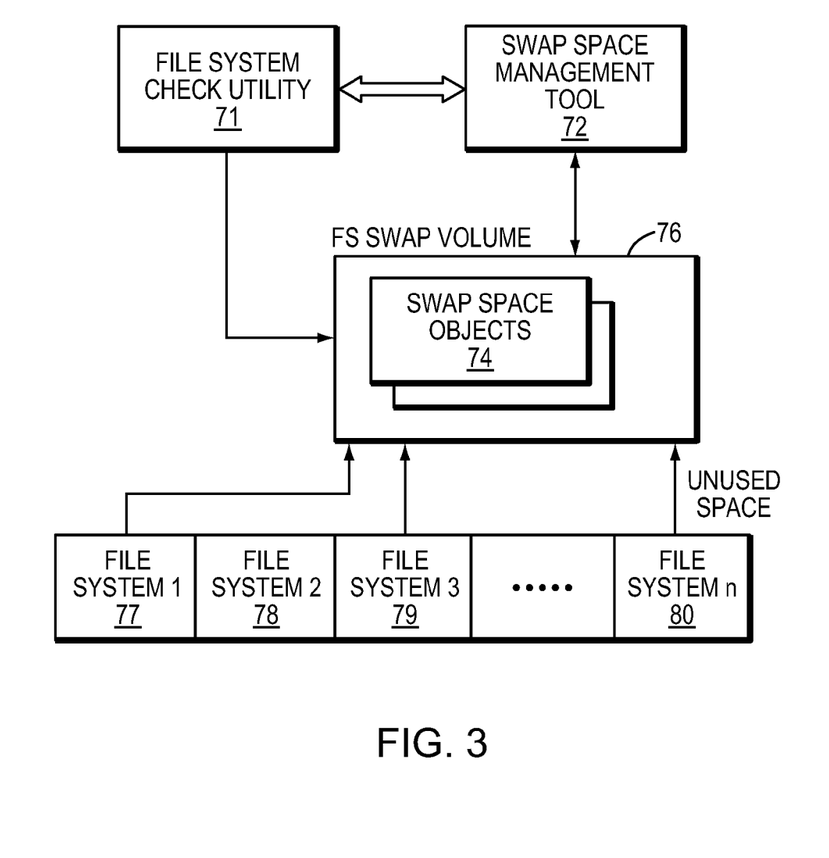
FIGS. 3-10 are diagrams illustrating in more detail components that may be used in connection with techniques herein.

Referring to FIG. 3, shown is a more detailed representation of components that may be included in an embodiment using the techniques herein. File system checking (FSCK) utility 71 may require a large amount of memory to store information (e.g., metadata bitmaps) in order to verify integrity of a file system. As a result, in a storage system environment having limited amount of storage and memory resources, swap space management tool 72 creates and manages a storage space for storing information required by FSCK utility 71 to verify a file system. Additionally swap space management tool 72 enables FSCK utility 71 to retrieve the information from the storage space at a later time prior to completion of FSCK of the file system. Swap space management tool 72 also allows FSCK utility 71 to store and retrieve fixed size objects to the storage space created for storing information required by FSCK utility 71 transparently. Prior to starting verification of a file system, FSCK utility 71 determines the amount of memory required to store information needed to verify metadata of the file system and optionally recover inconsistent metadata of the file system. File system swap volume 76 is created for a file system to store the information required by FSCK utility 71. Swap space management tool 72 creates one or more swap space objects 74 within file system swap volume 76 that provide an interface to FSCK utility 71 for storing and retrieving fixed size objects.

File systems 77, 78, 79, 80 typically include metadata describing attributes of a file system and data from a user of the file system. A file system contains a range of file system blocks that store metadata and data. One or more file system blocks in the file system may be left unused because file system blocks that store metadata end at a certain offset in order to create an alignment in underlying disk storage space for optimizing performance of an I/O operation. One or more file system blocks that are left unused are located between an offset within a file system where metadata ends and an offset within the file system where user's data starts. In at least one embodiment of the current technique, swap space management tool 72 uses unused file system blocks of a file system to create swap space objects 74. Thus, swap space objects 74 are created from chunks of unused space in a file system to store information required by FSCK utility 71 to verify and recover the file system. Swap space management tool 72 provides swap space objects 74 to FSCK utility 71 as logical objects having logical contiguous address space. Thus, swap space objects 74 include mapping of logical address of an information used by FSCK utility 71 to physical block address of the information. Further, swap space objects 74 are identified by a unique application identifier for easy access to information stored in swap space objects 74. Because the space required to run KSCK utility 71 is created from unused file system blocks of a file system, management of the space is tied to the lifecycle of the file system and makes management of the space easier in order to pause and resume a long running FSCK processing of the file system.

Figure 4:
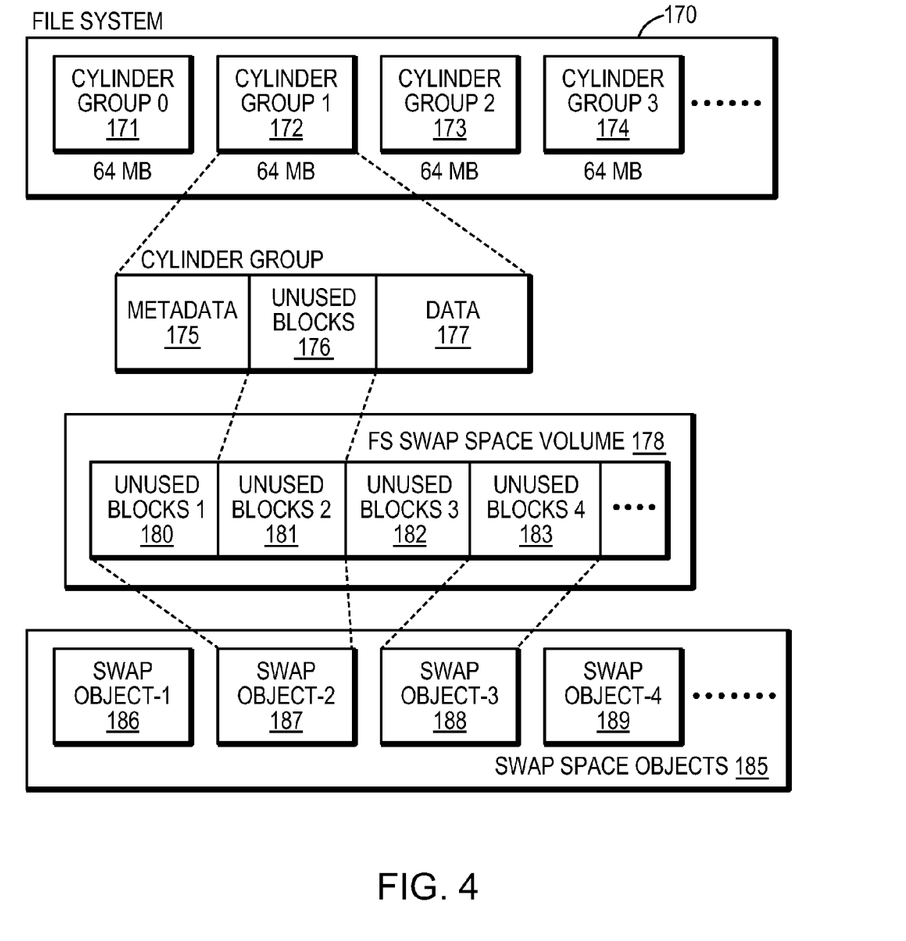

Referring to FIG. 4, shown is a more detailed representation of components that may be included in an embodiment using the techniques herein. A logical address space of a file system is typically divided into equal sized chunks. Each chunk is known as a cylinder group. In at least some embodiments of the current technique, size of the cylinder group may be 64 megabytes (MB). For example, in FIG. 4, file system 170 includes cylinder groups 171-174. A cylinder group in a file system includes a range of file system blocks. A part of each cylinder group stores metadata 175 of the file system occupying one or more file system blocks and a part of each cylinder group stores user's data 177 occupying one or more file system blocks. In order to increase performance of I/Os directed to file system blocks containing metadata and user's data in a cylinder group, the offset at which metadata blocks ends is rounded up to a specific file system block number of the cylinder group. As a result, one or more file system blocks 176 are left unused between the offset at which metadata blocks ends and the offset at which data blocks starts in the cylinder group. For example, in FIG. 4, File system swap space volume 178 includes a set of unused file system blocks 180-183 gathered from each cylinder group of file system 170. The set of unused file system blocks are concatenated and presented to FSCK utility 71 as a logical contiguous address space. The logical contiguous address space is further divided into fixed sized chunks. Each chunk is known as a slice. In at least some embodiments of the current technique, size of the slice may be 1 gigabyte (GB). Based on size of a file system, FSCK utility 71 determines the amount of storage space required to verify the file system. Based on the amount of storage space required, FSCK utility 71 then determines the number of slices needed to store information regarding metadata of the file system. File system swap space volume 178 presents the storage space created from unused file system blocks 180-183 to FSCK utility 71 as slices of storage space. The slices of storage space is then used by FSCK utility 71 to create swap objects 185-189 for storing information needed to verify the file system.

Figure 5:
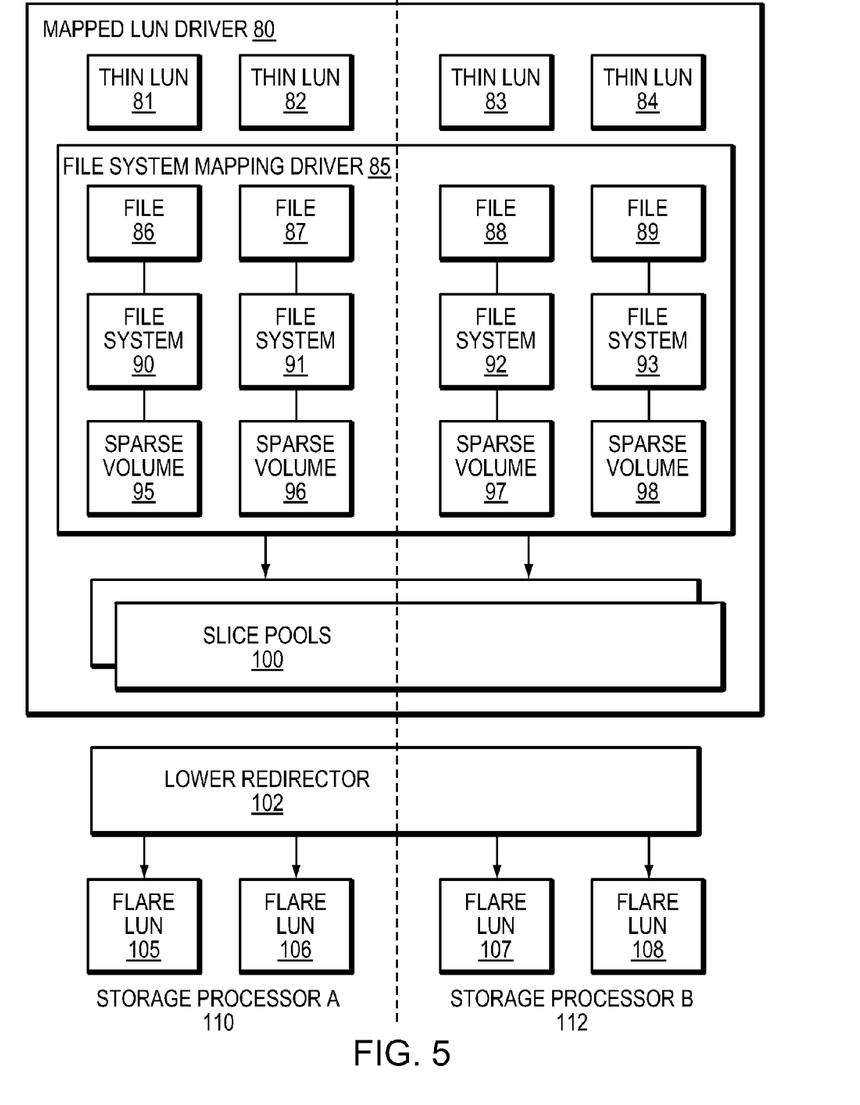

Referring to FIG. 5, shown is more detailed example of an embodiment of a computer system that may be used in connection with performing the techniques described herein. In a data storage system such as data storage system 70, a storage processor provides communications between host 11 and disk drives 60. Data storage system 70 includes at least two storage processors 110, 112. Both storage processor A (SPA) 110 and storage processor B (SPB) 112 provides access to Flare LUNs 105-108 built from a storage space provided by disk drives 60. Generally, a Flare LUN can only be accessed by one storage processor. Lower redirector 102 interacts with storage processors 110, 112 to access Flare LUNs 105-108. The access to Flare LUNs 105-108 is independent of which storage processor each Flare LUN belongs to. A user of data storage system 70 allocates storage from Flare LUNs in fixed sized chunks. Each fixed size chunk is known as a slice. One or more slices are grouped together to create a slice pool. Host system 11 provisions storage from slice pools 100 for creating thin LUNs 81-84. A thin LUN is a LUN that is visible to host system 11 and a user of a data storage system. The size of a thin LUN is independent of amount of available storage. Typically, storage is allocated when host system 11 issues a write request and needs a data block to write user's data. File system mapping driver 85 is a light-weight file system library that provides file system functionality and allows data storage system 70 to create files within a file system. File system mapping driver 85 processes I/Os directed to metadata of a file system. Mapped LUN driver 80 processes I/Os directed to data of the file system. Mapped LUN driver 80 also provides slices of storage from slice pools 100 to file system mapping driver 85 for creating a file system. Slices of storage can be dynamically added or removed by a file system. When a slice is removed, the file system redistributes data stored on the slice to other slices in the file system. File system mapping driver 85 allocates file system blocks from slices of storage for creating files and storing metadata of a file system. In at least some embodiments of the current technique, size of the file system block may be 8 kilobyte (KB) in size. A sparse volume concatenates slices of storage provided to file system mapping driver 85 into a logical contiguous address space on which a file system is created. The sparse volume maintains logical to physical mapping for slices of storage used to create the file system. Further, the file system maintains an allocation bitmap for every slice of physical storage that is used to create the file system. A thin LUN presents a file as a LUN to host system 11. Further, the file presents a contiguous logical address space to the thin LUN. For example, in FIG. 5, thin LUN 81 presents file 86 as a LUN to host system 11, file 86 is created in a file system 90 and file system 90 is created from sparse volume 95. Similarly, thin LUNs 82-84 presents file 87-89 as LUNs respectively to host system 11, files 87-89 are created in file systems 91-93 respectively and file systems 91-93 are created from sparse volumes 96-98 respectively. Further, sparse volumes 95-98 are created from slices of physical storage included in slice pools 100.

Figure 6:
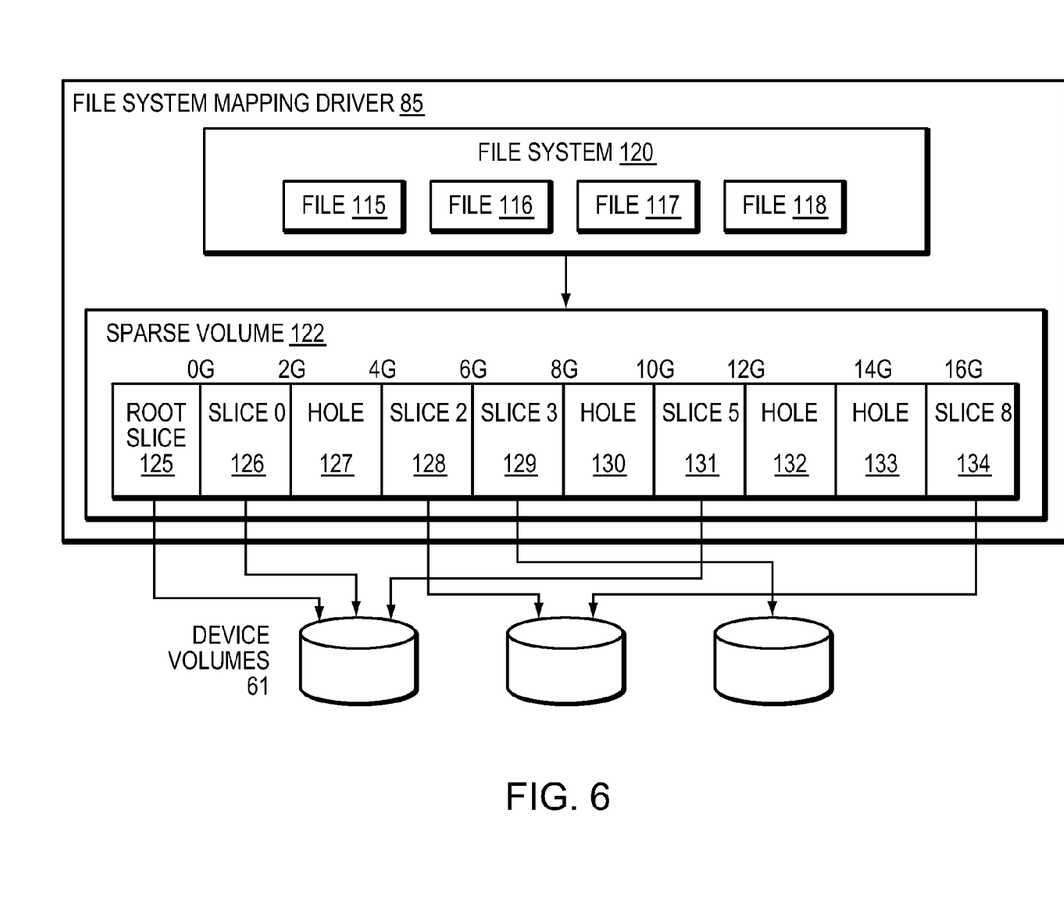

Referring to FIG. 6, shown is more detailed representation of a file system mapping driver 85 that may be included in an embodiment using the techniques herein. Sparse volume 122 aggregates one or more slices of physical storage together into a contiguous logical address space while some of these slices may or may not be provisioned. A provisioned slice has physical storage space allocated for storing data in the provisioned slice. For example, in FIG. 6, sparse volume 122 aggregates slices 125-134 together into a logical address space of 16 gigabyte (GB), where each slice is 2 gigabyte (GB) in size. Root slice 125 and Slice-0 126 in a sparse volume is always provisioned, such that a storage space is available to store metadata information for the sparse volume 122. File system 120 is created from the contiguous logical address space provided by the sparse volume 122. A user of data storage system 70 creates files 115-118 in file system 120. Each provisioned slice of a sparse volume has a corresponding configured slice object that is mapped to a corresponding LUN of physical storage included in device volumes 61. In at least some implementations, root slice 125 is stored in a data portion of slice-0 126, but for generality, the root slice is defined independently of the slice-0. Additionally, root slice 125 holds logical to physical address mapping for sparse volume 122.

At any given time, a storage space for each cylinder group of a file system is either allocated (also referred to as provisioned) or not. If a storage space for a cylinder group is not allocated, then there is said to be a hole at that location in a logical extent of the file system. Further, each provisioned slice of a sparse volume contains a certain multiple of cylinder groups of a file system. None, some, or all of the cylinder groups contained in a provisioned slice can be allocated at any given time. If all of the cylinder groups in a particular provisioned slice are not allocated, then the slice can be deallocated, so that a hole will then appear in a logical address space of the sparse volume. For example, in FIG. 6, logical address space of sparse volume 122 has four holes 127, 130, 132, 133 indicating that slices corresponding to those location are not provisioned.

Figure 7:
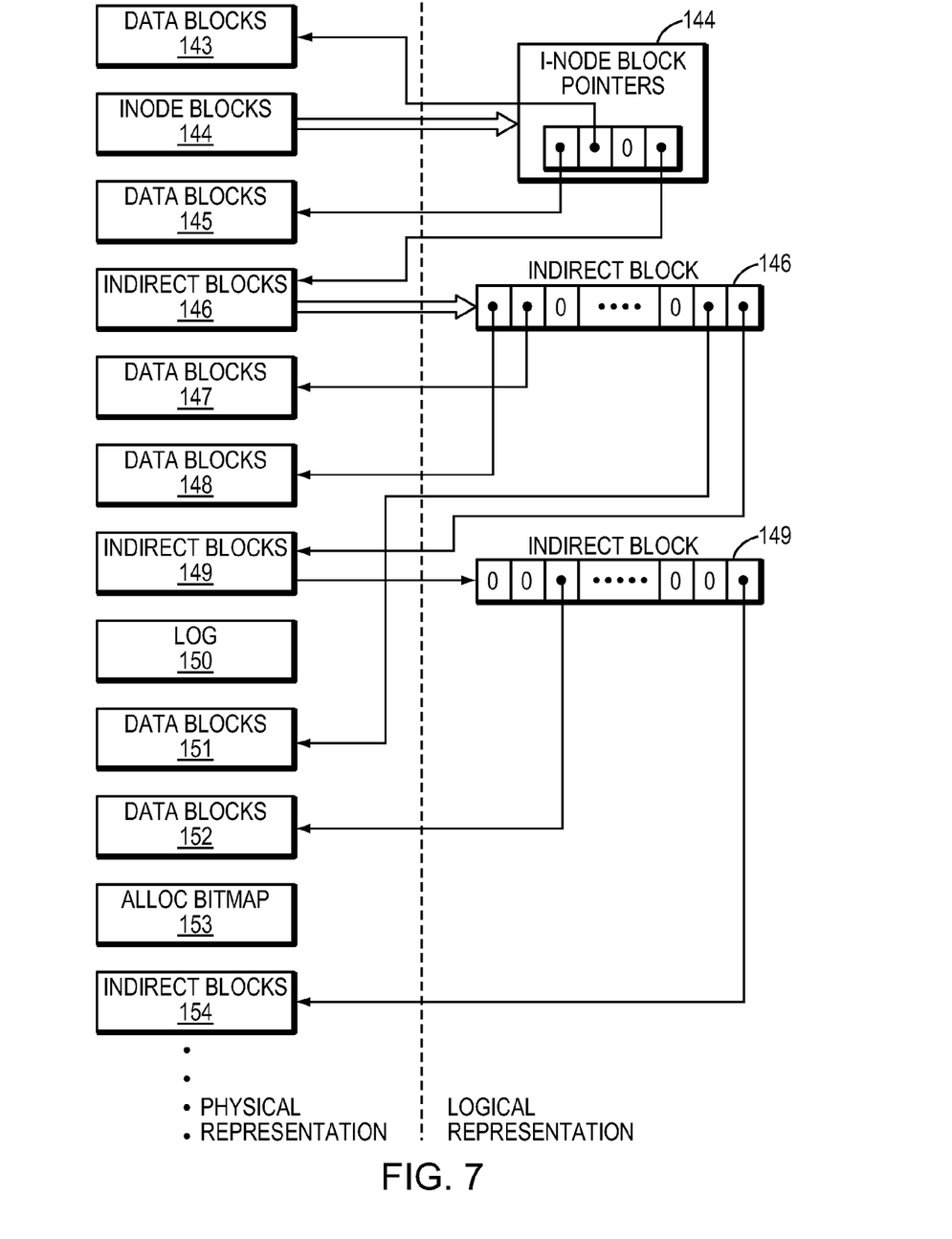

Referring to FIG. 7, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode 144 containing attributes ("metadata") of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 8:
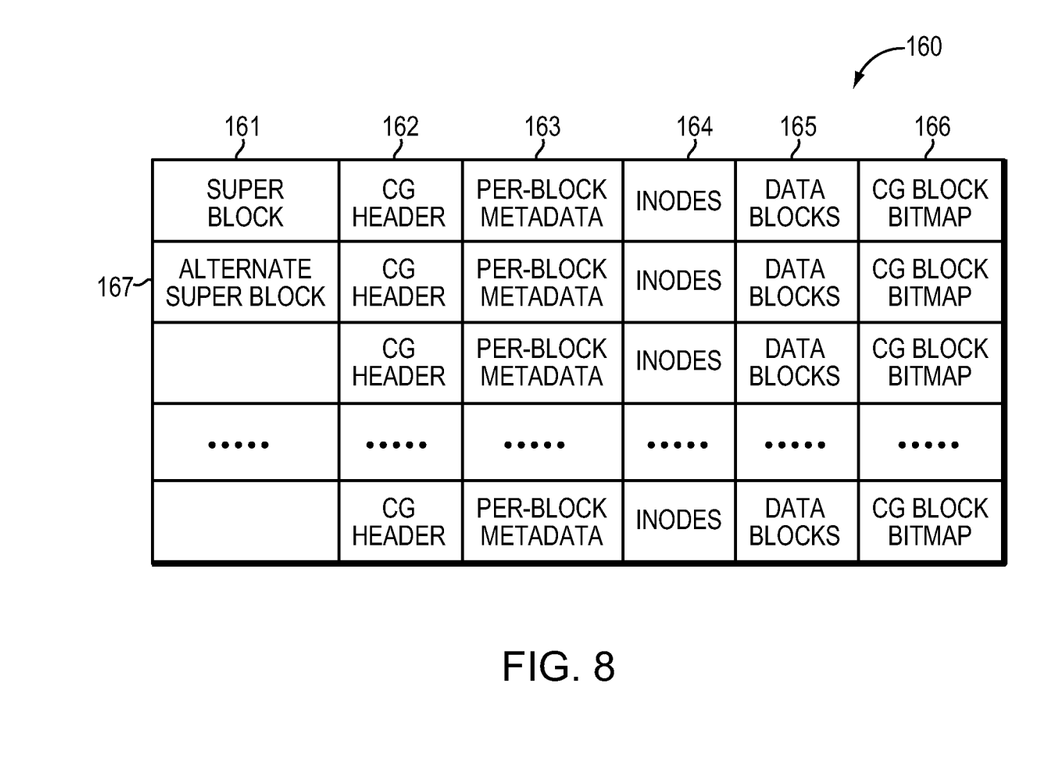

Referring to FIG. 8, shown is a memory map of a logical extent of a file system that may be included in an embodiment using the techniques herein. Each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of the cylinder group, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 8) that may be included in a file system stored in data storage system 70.

Figure 9:
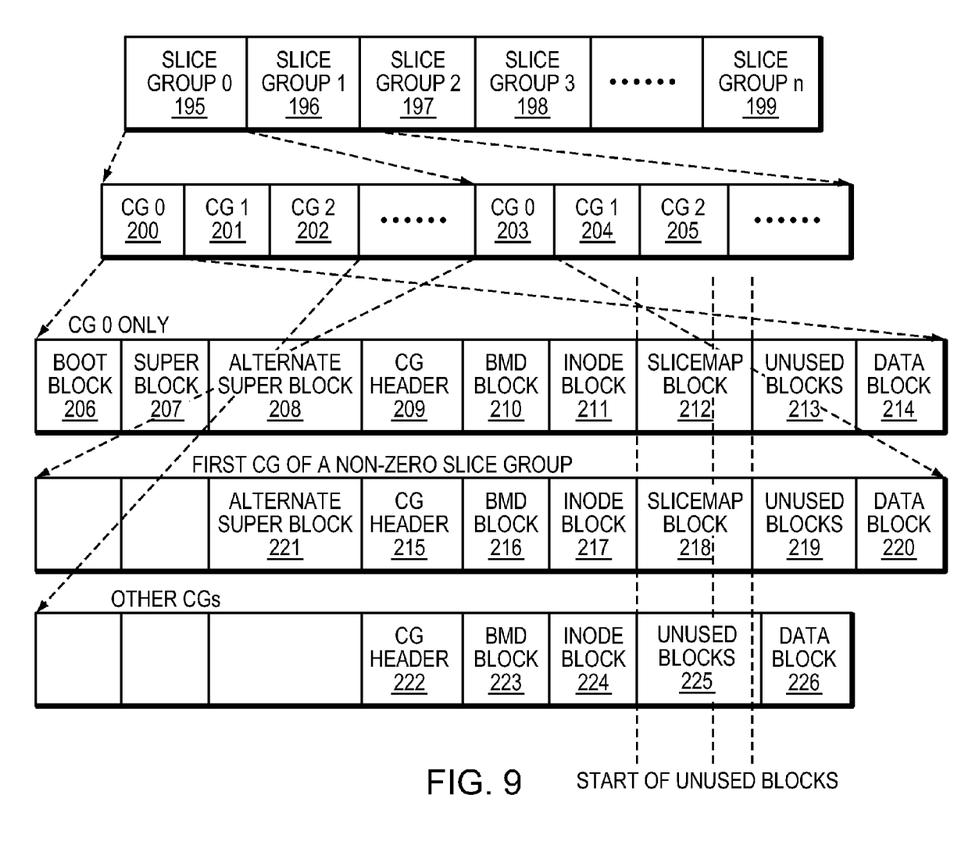

Referring to FIG. 9, shown is more detailed representation of components that may be included in an embodiment using the techniques herein. A file system consists of one or more slice groups 195-199. Each slice group consists of one or more slices of storage. A logical extent of the file system is further subdivided into self-contained cylinder groups. Each slice of the slice group 195 includes one or more cylinder group entries 200, 201, 202 and so on. Similarly, for example, slice group-1 196 includes cylinder groups 203, 204, 205 and so on. Each cylinder group entry in a slice group is of fixed size, such that the size of the cylinder group entry is the granularity of storage provisioning for the file system. For example, if the file system block size is 8 kilobytes (KB), size of the file system is 4 gigabyte (GB) and size of the cylinder group is 64 megabytes (MB), then the file system includes sixty four cylinder group entries, and each cylinder group entry includes 8192 file system blocks. A part of each cylinder group contains metadata of the file system. Other part of each cylinder group contains user's data that is stored in one or more data blocks. With reference also to FIG. 8, first cylinder group (CG0 200) entry of first slice group of the file system, known as slice group-0 195, includes metadata of the file system that contains boot block 206, super block 207, alternate super block 208, cylinder group header 209, per block metadata (BMD) 210, inode block 211 and slicemap block 212. Thus, metadata included in the first cylinder group ends at an offset where slicemap block 212 ends. Data of the file system starts at an offset where data blocks 214 starts. The offset indicating end of metadata blocks is rounded up to a certain file system block number in the cylinder group. As a result, one or more file system blocks 213 are left unused after the offset at which metadata blocks ends and before the offset at which data blocks 214 starts. The first cylinder group (e.g. CG1 203) of every slice group other than slice group-0 195 (non-zero slice group) includes metadata containing alternate super block 221, cylinder group header 215, per block metadata (BMD) 216, inode block 217 and slicemap block 218. Data of the first cylinder group of a non-zero slice is contained in data blocks 220. Unused file system blocks 219 in the first cylinder group of a non-zero slice group starts at different offset compared to the first cylinder group of slice group-0. Cylinder groups other than the first cylinder group (e.g. CG2 202, CG1 204 etc.) of every slice group includes metadata containing cylinder group header 222, per block metadata (BMD) 223, inode block 224 and data blocks 226. Unused blocks 225 in cylinder groups other than the first cylinder group starts at different offset compared to the first cylinder group CG-0 200 of slice group-0 195 and the first cylinder group (e.g. CG0 203) of a non-zero slice group.

Figure 10:
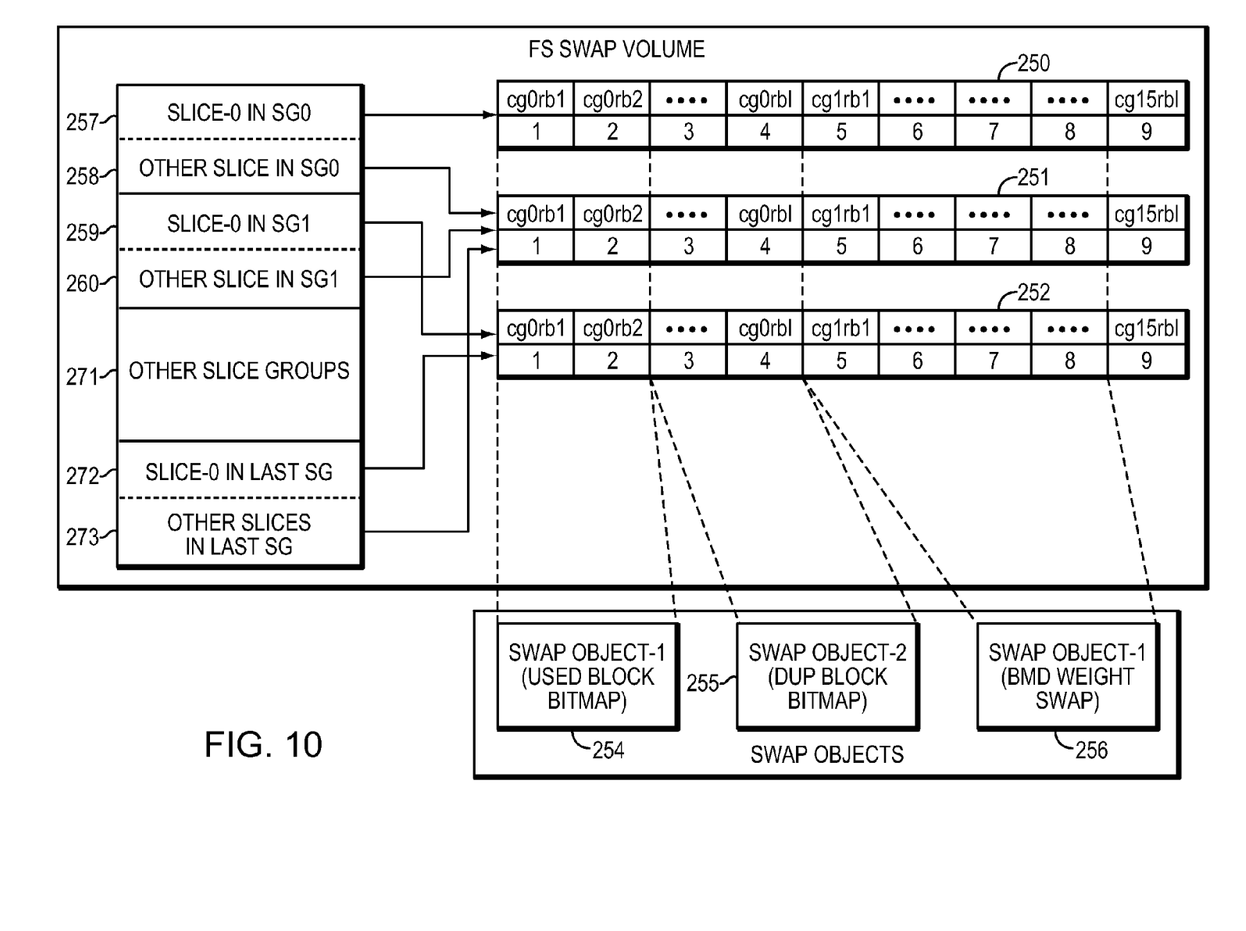

Referring to FIG. 10, shown is more detailed representation of a file system swap volume created for file system checking that may be included in an embodiment using the techniques herein. With reference also to FIG. 4, a file system swap volume includes a set of logical arrays created from unused file system blocks that exists in each slice of every slice group that is part of a logical address space of a file system. Every slice group of the file system includes slices that has same layout except the first slice of the first slice group that has a different layout. As a result, two different logical arrays are maintained in the file system swap volume for every slice group to convert logical address mapping of a file system block to physical block address. A swap object is created by selecting unused blocks from logical arrays maintained in the file system swap volume. For example, in FIG. 10, the file system swap volume includes logical array 250 created from unused file system blocks contained in slice-0 of slice group-0 257. Logical array 251 is created from unused file system blocks contained in slices other than slice-0 of slice group-0 258, slices other than slice-0 of slice group-1 260, other slice groups 271 and slices other than slice-0 of last slice group 273 in the file system. Similarly, logical array 252 is created from unused file system blocks contained in slice-0 of slice group-1 259 and slice-0 of last slice group 272 in the file system. Certain number of unused file system blocks are selected from each of the logical arrays in the file system swap volume to create a swap object. For example, in FIG. 10, swap object-1 254 is created by selecting two unused blocks from each logical array 250, 251 and 252 in the file system swap volume. Similarly, swap object-1 255 is created by selecting two unused blocks from each logical array 250, 251 and 252 in the file system swap volume. Swap object-1 256 is created by selecting four unused blocks from each logical array 250, 251 and 252 in the file system swap volume.

Figure 11:
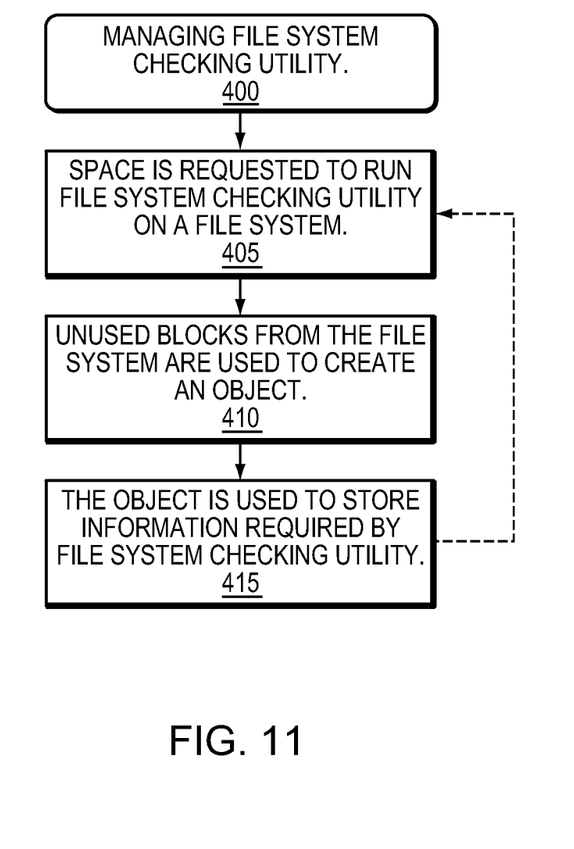
FIGS. 11-12 are flow diagrams illustrating processes that may be used in connection with techniques herein.

Referring to FIG. 11, shown is a flow diagram illustrating the method of managing a file system checking utility in a data storage system. The file system checking (FSCK) utility starts processing to verify integrity of a file system and to optionally repair the file system on finding inconsistency in metadata of the file system (step 400). The file system checking utility determines the amount of space required to verify the file system and then request that space from the data storage system to store information needed to verify metadata of the file system (step 405). An object corresponding to the amount of space requested by the FSCK utility is created from unused file system blocks in the file system to verifying integrity of the file system (step 410). The FSCK utility then uses the object to store information required to find inconsistency in metadata of the file system in order to verify integrity of the file system (step 415).

Figure 12:
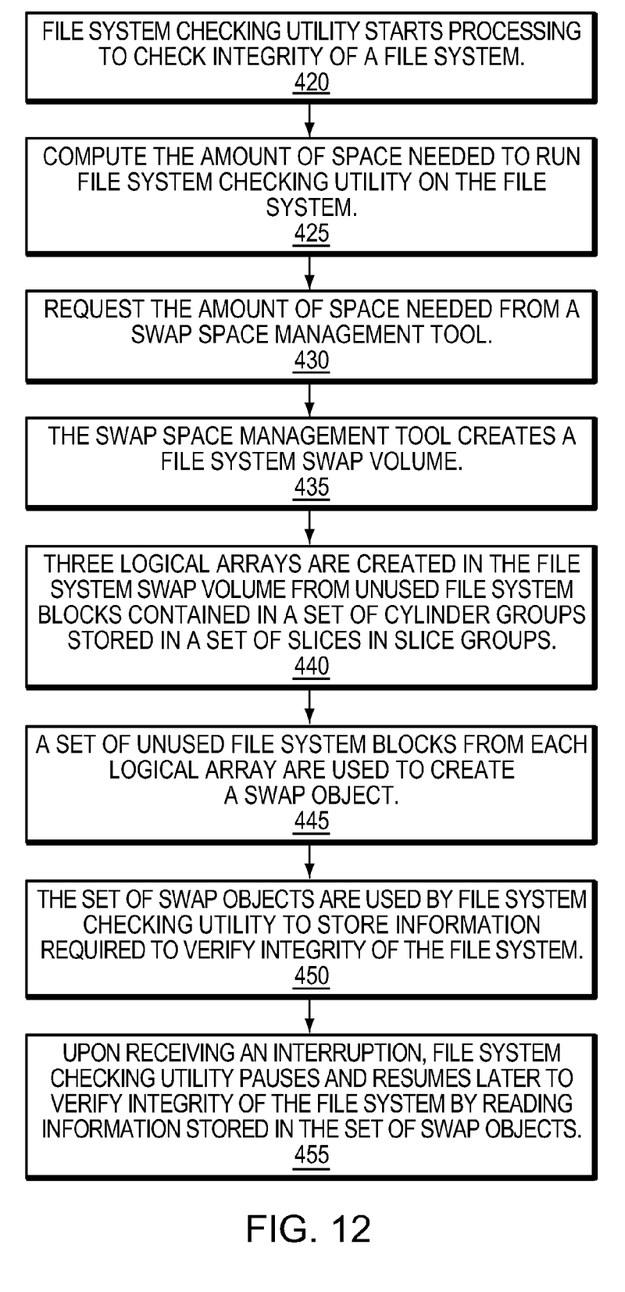

Referring to FIG. 12, shown is a flow diagram illustrating in detail the method of managing a file system checking utility in a data storage system. The file system checking (FSCK) utility starts processing to verify integrity of a file system and to optionally repair the file system on finding inconsistency in metadata of the file system (step 420). The file system checking utility computes the amount of space required to verify the file system (step 425). Determination of the amount of space is based on size of the file system. With reference also to FIGS. 3 and 4, the FSCK utility then requests that space from swap space management tool 72 (step 430). Swap space management tool 72 then creates a file system swap volume to store information needed to verify metadata of the file system (step 435). With reference also to FIG. 10, three logical arrays are created in the file system swap volume to store information required by the FSCK utility to verify the file system. Logical arrays are created from unused file system blocks contained in a set of cylinder groups stored in a set of slices in slice groups (step 440). A set of unused file system blocks from each logical array are used to create a swap object (step 445). A set of swap objects are created based on the amount of space required by the FSCK utility. The FSCK utility stores information required to verify metadata of the file system in the set of swap objects (step 450). When the FSCK utility is interrupted and file system checking process is paused as a result of the interruption, processing of metadata resumes at a later time by retrieving information stored in the set of swap objects. (step 455).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing file system checking, the method comprising:
    creating a logical volume from a set of unused file system blocks, wherein respective one or more unused file system blocks residing between respective metadata and data stored in each cylinder group of a set of equal sized cylinder groups of a file system are organized to create the set of unused file system blocks, wherein a logical address space of the file system is apportioned into the set of equal sized cylinder groups, each cylinder group of the set of equal sized cylinder groups includes a set of file system blocks configured to store metadata and data of the file system;
    allocating a logical space from the logical volume, wherein the logical space is used to create a set of logical objects for storing information, wherein the information is required to perform file system checking on the file system; and
    performing file system checking on the file system, wherein performing file system checking on the file system includes determining an inconsistency in metadata of the file system.

2. The method of claim 1, wherein unused blocks in each cylinder group of the set of cylinder groups are located between first and second offsets in the file system, wherein the first offset indicates location of end of metadata and the second offset indicates location of start of data.

3. The method of claim 1, wherein a logical address space of a file system is apportioned into a set of cylinder groups.

4. The method of claim 1, further comprising:
    creating a swap space volume from the logical space; and
    creating a set of swap space objects in the swap space volume, wherein information required to perform file system checking is stored in the set of swap space objects.

5. The method of claim 1, further comprising:
    creating a set of slices from the logical space; and
    providing the set of slices to a swap space management tool for managing information stored in the logical space.

6. The method of claim 1, further comprising creating a set of arrays from respective unused blocks in each cylinder group of the set of cylinder groups, wherein a set of swap space objects are created from respective unused blocks in each array of the set of arrays.

7. The method of claim 1, further comprising:
    determining an amount of space required to perform file system checking on a file system; and
    requesting the amount of space from a swap space management tool, wherein the swap space management tool allocates the amount of space by creating a set of slices from the logical space.

8. The method of claim 1, further comprising pausing file system checking on the file system.

9. The method of claim 1, further comprising resuming file system checking on the file system by reading information stored in the logical space.

10. A system for use in managing file system checking, the system comprising:
    first logic creating a logical volume from a set of unused file system blocks, wherein respective one or more unused file system blocks residing between respective metadata and data stored in each cylinder group of a set of equal sized cylinder groups of a file system are organized to create the set of unused file system blocks, wherein a logical address space of the file system is apportioned into the set of equal sized cylinder groups, each cylinder group of the set of equal sized cylinder groups includes a set of file system blocks configured to store metadata and data of the file system;
    second logic allocating a logical space from the logical volume, wherein the logical space is used to create a set of logical objects for storing information, wherein the information is required to perform file system checking on the file system; and
    third logic performing file system checking on the file system, wherein performing file system checking on the file system includes determining an inconsistency in metadata of the file system.

11. The system of claim 10, wherein unused blocks in each cylinder group of the set of cylinder groups are located between first and second offsets in the file system, wherein the first offset indicates location of end of metadata and the second offset indicates location of start of data.

12. The system of claim 10, wherein a logical address space of a file system is apportioned into a set of cylinder groups.

13. The system of claim 10, further comprising:
    fourth logic creating a swap space volume from the logical space; and
    fifth logic creating a set of swap space objects in the swap space volume, wherein information required to perform file system checking is stored in the set of swap space objects.

14. The system of claim 10, further comprising:
    fourth logic creating a set of slices from the logical space; and
    fifth logic providing the set of slices to a swap space management tool for managing information stored in the logical space.

15. The system of claim 10, further comprising:
    fourth logic creating a set of arrays from respective unused blocks in each cylinder group of the set of cylinder groups, wherein a set of swap space objects are created from respective unused blocks in each array of the set of arrays.

16. The system of claim 10, further comprising:
    fourth logic determining an amount of space required to perform file system checking on a file system; and
    fifth logic requesting the amount of space from a swap space management tool, wherein the swap space management tool allocates the amount of space by creating a set of slices from the logical space.

17. The system of claim 11, further comprising:
    fourth eleventh logic pausing file system checking on the file system.

18. The system of claim 11, further comprising:
    fourth logic resuming file system checking on the file system by reading information stored in the logical space.

* * * * *